(12) United States Patent
Vignaud

(10) Patent No.: US 7,228,330 B2
(45) Date of Patent: Jun. 5, 2007

(54) METHOD FOR THE OPTIMIZATION OF NETWORK TRAFFIC, AND ASSOCIATED IMPLEMENTATION DEVICE

(75) Inventor: Frédéric Vignaud, Les Jaillères (FR)

(73) Assignee: Cegetel Groupe, Paris (FR)

( * ) Notice: Subject to any disclaimer, the term of this patent is extended or adjusted under 35 U.S.C. 154(b) by 725 days.

(21) Appl. No.: 10/382,061

(22) Filed: Mar. 5, 2003

(65) Prior Publication Data

US 2003/0172112 A1    Sep. 11, 2003

(30) Foreign Application Priority Data

Mar. 5, 2002    (FR)    ................... 02 02806

(51) Int. Cl.
*G06F 15/16* (2006.01)
(52) U.S. Cl. ................. 709/203; 709/227; 709/228; 709/241; 370/238
(58) Field of Classification Search ........ 709/203, 709/217–219, 227, 229, 220–222, 237–238, 709/241; 370/238, 239
See application file for complete search history.

(56) References Cited

U.S. PATENT DOCUMENTS

| | | | | |
|---|---|---|---|---|
| 5,673,322 | A | 9/1997 | Pepe et al. | ............. 380/49 |
| 6,507,867 | B1 * | 1/2003 | Holland et al. | ............. 709/219 |
| 6,615,267 | B1 * | 9/2003 | Whalen et al. | ............. 709/229 |
| 6,895,444 | B1 * | 5/2005 | Weisshaar et al. | .......... 709/203 |
| 7,054,903 | B2 * | 5/2006 | Kadyk et al. | ............... 709/203 |
| 7,075,908 | B2 * | 7/2006 | Noguchi et al. | ............ 370/329 |
| 2002/0002615 | A1 * | 1/2002 | Bhagavath et al. | ......... 709/227 |
| 2002/0038371 | A1 * | 3/2002 | Spacey | ....................... 709/227 |
| 2003/0149720 | A1 * | 8/2003 | Goldstein | ................... 709/202 |

OTHER PUBLICATIONS

Zenel B., "A General Purpose Proxy Filtering Mechanism Applied to the Mobile Environment," Wireless Networks, ACM, US, vol. 5, No. 5, Oct. 1999.
Bieszczad, A., et al., "Network Management Application-oriented Taxonomy of Mobile Code," Network Operations and Management Symposium, 1998.

* cited by examiner

*Primary Examiner*—Philip B. Tran
(74) *Attorney, Agent, or Firm*—Boyle Fredrickson Newholm Stein & Gratz S.C.

(57) ABSTRACT

In a method in which a proxy is installed in a mobile telephone, this proxy has the role of simulating a service server to make a client application of the telephone believe that communication has truly been set up with a service server and thus obtain local processing, in the client apparatus, of the maximum number of the requests sent by the client application. Another role of this proxy is to engage in dialog with a network controller server. The network controller server substitutes itself for the client application for the polling and communicates with the proxy for the management of the requests sent by the client application.

16 Claims, 3 Drawing Sheets

METHOD FOR THE OPTIMIZATION OF NETWORK TRAFFIC, AND ASSOCIATED IMPLEMENTATION DEVICE

BACKGROUND OF THE INVENTION

1. Field of the Invention

An object of the invention is a method for the optimization of network traffic, and associated implementation devices. The field of the invention is that of telecommunications networks, and of the services accessible through these networks. More particularly, the field of the invention is that of access to services, through networks, by using mobile clients. A mobile client is a smart apparatus capable of implementing a communications program to access one or more telecommunications networks and thus get connected to a server corresponding to a service to which the user of the mobile client subscribes.

It is an aim of the invention to reduce the stream of information received and sent out by the mobile client to access different services to which the user subscribes.

It is another aim of the invention to reduce the RF activity of a mobile client.

Yet another aim of the invention is to reduce the power consumption of a mobile client.

2. Brief Description of the Prior Art

In the prior art, there are various known methods of trying to resolve these problems. A first method is called the "optimization of routing protocols". A routing protocol, or protocol in general, defines formats for information exchanges between two apparatuses communicating through a network. A protocol defines, in particular, the information to be transmitted through frames or messages. In the prior art, optimizing a protocol means reducing the size of the frames sent. This is actually a rationalizing of the information transmitted. It is then ensured that there is no longer any transmission of information that is redundant or unnecessary the context in which the message or frame is sent.

Another solution implemented is the use of a cache memory. A cache memory is a memory that preserves the trace of the most recent operations performed by the user of the apparatus in which this cache memory is installed. Thus, if the user makes the same request twice, it is no longer necessary to look for the answer to this request on the network, since this answer is already in the cache memory. Such an approach is inappropriate because the response to a request may depend on the instant at which the question is asked. To the extent that the cache memories are not updated so as to limit the net stream, the responses given to identical requests will not always be relevant. This is especially true in electronic messaging applications for example. Indeed a client, or client application, regularly makes interrogations to find out if new messages have arrived. The request is therefore always identical but the answer is not necessarily always the same. This answer therefore cannot be recorded in a cache memory. These periodic interrogations are also called polling.

In a third solution, the stream is reduced by compressing the transmitted data. However, this technique has the effect of maintaining major RF activity as well as network occupancy. Furthermore, it gives rise to additional calculations because the data sent have to be compressed and decompressed. This approach gives a small gain in network compactness but, in this case, there is a loss of autonomy for a mobile client because the compression and decompression operations require a great deal of cycle time for the microprocessor and they therefore consume power.

Thus, none of the three existing solutions in the prior art significantly reduces the network activity of a client, especially that of a mobile client, none of them resolves the problem related to the regular interrogation of a server and, therefore, none of them resolves the problems of power consumption.

The persisting problem therefore, in many network protocols, is that the client periodically sends requests to the server in order to be informed of a modification of the context on the server. This periodic stream of requests is costly in terms of bandwidth and it is an essential goal of the invention to reduce this net stream.

SUMMARY OF THE INVENTION

The invention resolves these problems by controlling the net stream generated by the client for a service server by means of a local server program known as a proxy integrated into the client apparatus, the local server program being driven by a network controller server. The local server program is installed in the client apparatus. This local server program then intercepts all the traffic sent and/or received by the client apparatus.

Thus, firstly, the local server program is used to control the traffic. This control may consist of a relay mode in which the local server program sends the message initiated by the client to a server without carrying out any other processing. The local server program may also work in a blocking mode in which it blocks the messages initiated by the client and sent to the server. In the blocking mode, the local server program then responds to the client stating that the service server is inaccessible or busy. Finally, the local server program may work in a reset mode in which it intercepts the messages initiated by the client and sent them to a network controller server, without sending them to the service server for which the message was initially intended.

Furthermore, the local server program has a function of communication with the network controller server. This function enables the exchange of messages with the network controller server. This also enables the network controller server to control the mode of operation of the local server program.

The network controller server is an apparatus connected to the network. It has two main functions. A first function is a function of communications with a local server program. A second function is a function of interrogation of a service server, for example the interrogation of a messaging server.

The principle of the invention is the following. At an initial stage, the local server program is in reset mode. In this mode, it intercepts first messages sent by the client. These messages are initially intended for a service server. These messages are then retransmitted, by the local server program, to the network controller server. Upon reception of these messages, the network controller server gets parametrized so that it assumes the role of the client application by engaging in dialog with the service server. The messages received by the controller server during the reset phase comprise especially an identifier or "login" of the user of the client apparatus, as well as a password corresponding to this user's account on the service server. Similarly, the messages received comprise information on the frequency at which the service server is to be interrogated. The controller server is therefore in a position to get parametrized to perform the interrogation tasks of the client application.

After the reset phase, the local server program goes into blocking mode. The local server program remains in blocking mode until it receives a message from the controller server informing it of a change in context on the service server. In this case, the local server program goes into relay mode, and the client is in a position to interrogate the service server. A context comprises, for example, the number of messages not yet read, or new messages in an electronic letterbox.

An object of the invention therefore is a method for the optimization of network traffic comprising a mobile client and a service server, wherein the method comprises the following steps:
- a client application, executed by the mobile client, sends a first request intended for the service server,
- a local server program, executed by the mobile client, intercepts the first request intended for the service server,
- the local server program produces a resetting message from the contents of the first request, this resetting message comprising information, preferably an identifier and a password, enabling the controller server to assume the role of the client application, the resetting message also comprising information on a service server to be interrogated, preferably its address on a network and its type,
- the local server program sends the resetting message to the controller server,
- the controller server receives the resetting message and gets parametrized as a function of the contents of the resetting message to send requests addressed to the service server.

An object of the invention is also a client device, communicating on a network, wherein the client device comprises a program memory comprising instruction codes corresponding to a client application sending requests to a service server, the program memory also comprising instruction codes corresponding to a local server program to intercept and process messages sent by the client application and to receive and process messages sent by a controller server.

Yet another object of the invention is a controller server device, communicating on a network, wherein the controller server device comprises a configuration memory to record information pertaining to a resetting message, the controller server device also comprises a program memory comprising instruction codes to send requests to the service server as a function of the contents of the configuration memory, the program memory also comprising instruction codes to send an opening message and/or a status message to a local server program, as a function of a response to a request.

BRIEF DESCRIPTION OF THE DRAWINGS

The invention shall be understood more clearly from the following description and from the accompanying figures. These figures are given purely by way of an indication that in no way restricts the scope of the invention. Of these figures.

MORE DETAILED DESCRIPTION

Figure 1:
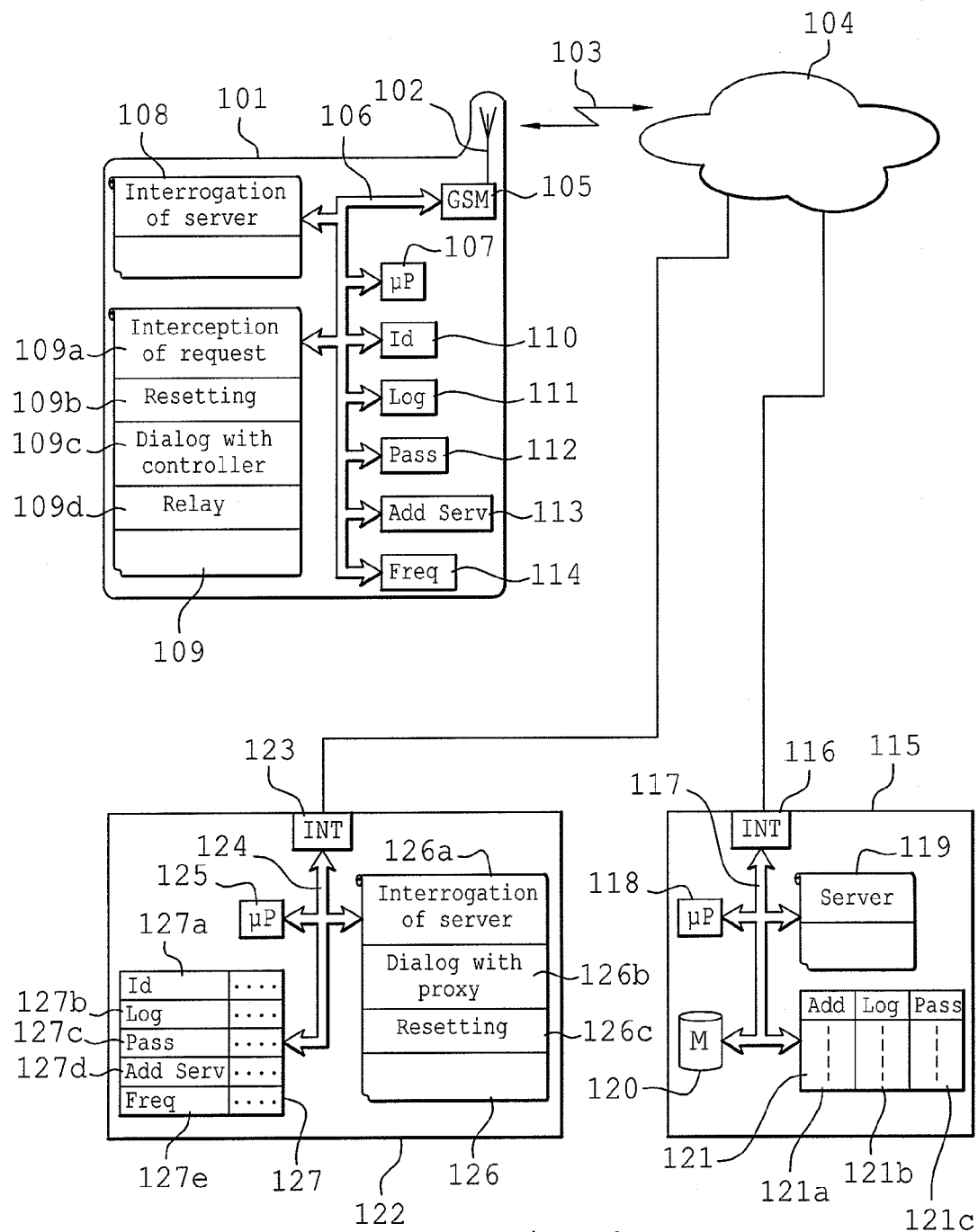
FIG. 1 is an illustration of means useful for the implementation of the method according the invention.

FIG. 1 shows a client apparatus 101 or mobile client 101. In the description, the mobile client 101 is taken to be a mobile telephone 101. The telephone 101 then has an antenna 102 enabling it to set up an RF link 103 with a cell network 104. The network 104 is not shown in detail. For the description, the network 104 is considered to comprise all the necessary elements enabling, for example, the telephone 101 to hook up to the Internet. Thus the network 104 comprises, inter alia, a base station to which the telephone 101 is connected as well as all the devices enabling the base station to be connected to the Internet.

The telephone 101 also comprises electronic circuits 105 connected firstly to the antenna 102 and secondly to an internal bus 106 of the telephone 101. The role of the circuits 105 therefore is to provide the radio interface between the telephone 101 and the network 104. In the description, the GSM standard has been chosen. However, it could be any other standard such as the PCS, DCS, UMTS or any other existing and/or future RF standard.

In the description, actions are attributed to apparatuses or to programs. This means that these actions are executed by a microprocessor of this apparatus, or by the apparatus comprising the program. Said microprocessor is then controlled by instruction codes recorded in a memory of the apparatus. These instruction codes are used to implement the means of the apparatus, and therefore to carry out the action undertaken.

The telephone 101 comprises a microprocessor 107 connected to the bus 106. The telephone 101 also has program memories 108 and 109. The memories 108 and 109 are shown as being distinct. However, along with all the other memories of the apparatus, they may be unified in one and the same component.

The memory 108 has instruction codes corresponding to a client application. An application of this kind is, for example, an electronic messaging software program. A software program of this kind enables the telephone 101 to interrogate an electronic messaging system, namely a service server, the service being the electronic messaging system.

The memory 109 is divided into several zones, each zone corresponding to a function, or a mode of operation, of the local server program or proxy. The memory 109 therefore actually corresponds to the instruction code of the local server program. A zone 109a comprises instruction codes to intercept a request sent, for example, by the client application 108. The zone 109b comprises instruction codes corresponding to operation in reset mode. A zone 109c comprises instruction codes corresponding to operation in communications mode with the network controller server. A zone 109d corresponds to the working of the local server program in relay mode.

The memories 108 and 109 are connected to the bus 106.

The telephone 101 also comprises other configuration memories. A memory 110 is used to record one or more identifiers/addresses of the telephone 101 for its communications with a network controller server or a service server. An identifier/address is for example an IPv4 (Internet protocol version 4) Internet address or an IPv6 Internet address. An identifier/address of this kind may also be a telephone number used to identify the telephone 101 on the cell network to which its user subscribes. This identifier/address is used in the context of a communication using short messages for example.

A memory 111 records an identifier of the user during the connection to a service server. An identifier 111 is associated with a password 112 recorded in the memory 112. A memory 113 records the address of the service server. An address of this kind is either an Internet address according to an IP (Internet protocol) or a URL (Universal Resource Locator). Finally a memory 114 is used to record an interrogation frequency of the service server.

The memories 110 to 114 are connected to the bus 106.

In practice, the memories 110 to 114 enable the recording of the parameters of the client application 108. The application 108 indeed needs the address 113 to send requests to a service server, an identifier 111 and a password 112 to be recognized by this service server and an address 110 so that the service server can respond to the request of the application 108.

FIG. 1 also shows a service server 115. The server 115 is connected to the network 104 through connection interface circuits 116. The circuits 116 are furthermore connected to an internal bus 117 of the service server 115. The service server 115 also comprises a microprocessor 118 as well as a program memory 119. The server 115 also comprises a storage memory 120 to record electronic messages as well as an identification memory 121 to identify the persons hooking up to the server 115. The elements 118 to 121 are connected to the bus 117.

The memory 119 has instruction codes by which the server 115 can manage the requests that it receives from the different clients, especially client applications such as the application 108.

The memory 121 is structured, for example, in a table 121. For example, each row of the table 121 corresponds to a person, and each column of the table 121 corresponds to a piece of information on this person. Thus the memory 121 comprises a column 121a corresponding to an electronic address, a column 121b corresponding to an identifier or "login" and a column 121c corresponding to a password.

FIG. 1 also shows a network controller server 122. The server 122 is connected to the network 104 through network interface circuits 123. The circuits 123 are furthermore connected to an internal bus 124 of the network controller server 122.

The network controller server 122 has a microprocessor 125, a program memory 126 and a configuration memory 127. The elements 125 to 127 are connected to the bus 124.

The memory 106 has instruction codes controlling the microprocessor 125. A zone 126a has instruction codes enabling the server 122 to interrogate the service server such as the server 115. A zone 126b comprises instruction codes enabling the server 122 to dialog with the local server program 109. A zone 126c comprises instruction codes corresponding to the management of the resetting messages sent by a local server program.

The reset memory 127 is structured in a table 127. For example, each column corresponds to a person and each row corresponds to a piece of information on this person. The memory 127 then comprises a row 127a corresponding to an identifier of a person, for example a telephone number or an Internet address. A row 127b corresponds to an identifier such as the identifier of the memory 111. A row 127c corresponds to a password, a row 127d corresponds to the address of a service server and a row 127e corresponds to a frequency of the interrogation of a service server.

All the elements of FIG. 1 are implemented by the method according to the invention.

Figure 2:
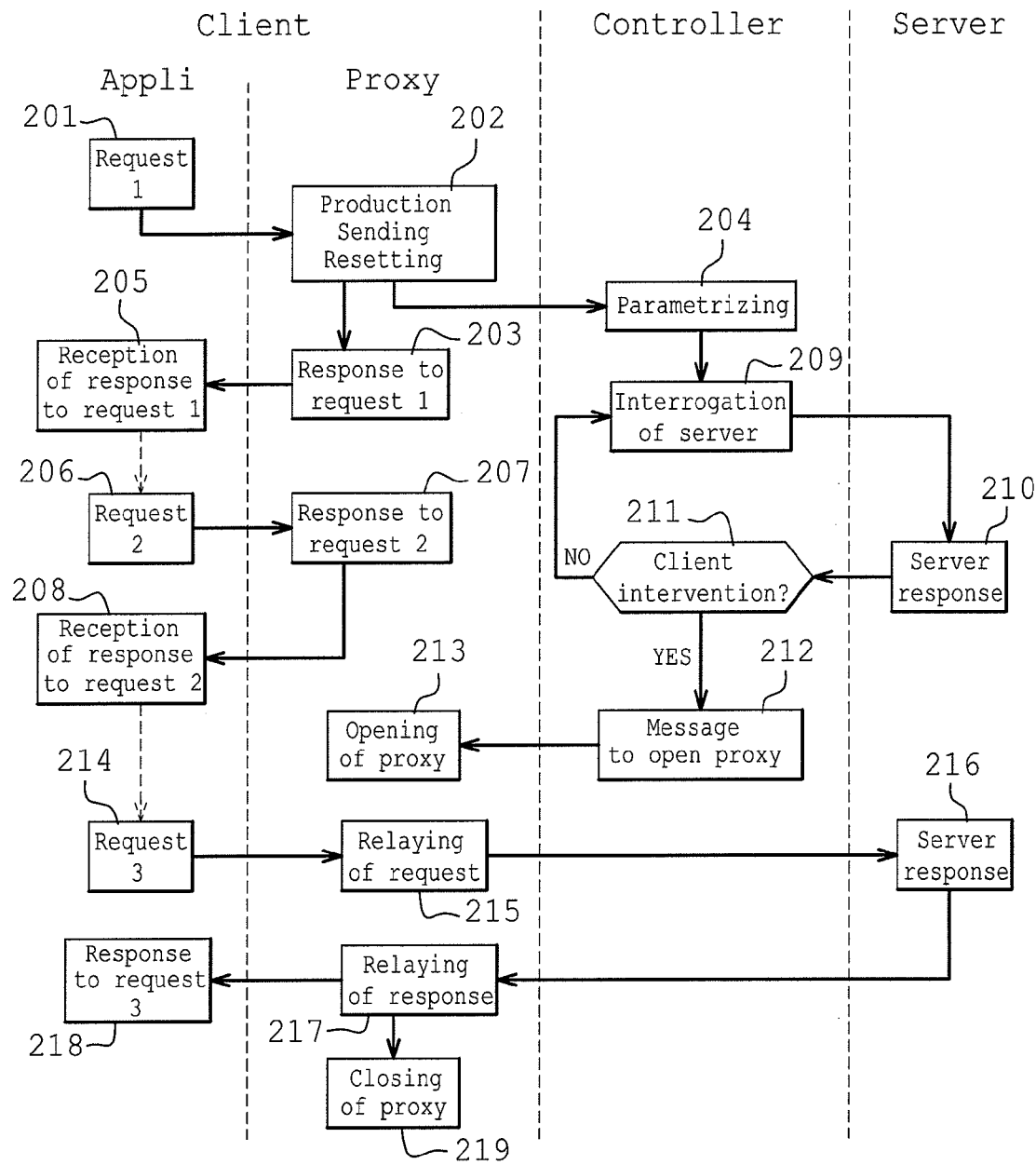
FIG. 2 is an illustration of steps of the method according to the invention.

FIG. 2 first of all highlights the fact that the steps of the method according to the invention are implemented on several apparatuses. The three apparatuses that come into play are a mobile client 101, a network controller server 122 and a service controller 115. For the description of the steps of the method according to the invention, an electronic messaging server has been chosen. Actions are therefore implemented by each of these apparatuses.

FIG. 2 furthermore shows that two applications coexist on the mobile client 101, or mobile telephone 101, each application in turn implementing steps of the method according to the invention. On the mobile telephone 101, it is therefore possible to distinguish a client application, for example an application used to interrogate an electronic messaging server and a local server application, or program, also known as a proxy. The steps of the method according to the invention are therefore also implemented by these two programs.

FIG. 2 shows a preliminary first step 201 for the transmission of a first interrogation request by the client application 108. This request is constituted according to an electronic messaging protocol. Such protocols are for example the POP and IMAP protocols. Such interrogation requests comprise an identifier of the server to which they are addressed, the identifier of the person sending the request, a password for this person and an identifier to respond to this request. These are, in fact, configuration parameters of the application 108. In the present example, the address of the service server corresponds to the address of the server 115; this is an Internet address. The identifier of the person corresponds to the contents of the memory 111 and the password corresponds to the contents of the memory 112. The address for the response may be either included in the routing protocol if it is the IP protocol or expressly placed in the request.

Once constituted, this request is sent. Here, in the step 201, the term "sent" must be understood to mean submitted to the microprocessor with instructions to send it through the RF means 105 and 102.

However, the microprocessor is also controlled by the local server program 109. The microprocessor therefore knows that it must intercept all the requests and other messages that have to be sent by RF means. Thus, the operation passes to a step 202 for the production and sending of a resetting message. In this step 202, the instruction codes of the zone 109a control the microprocessor 107. This enables the local server program 109 to intercept the request that has been sent by the application 108. The local server program 109 then determines whether it is the sending of the first request. This detection is relatively easy. It is sufficient, for example, to use a flag memory to memorize the fact that the request has already been sent or not sent by the application 108. If the flag memory indicates that no request has been sent, then the local server program 109 knows that the phase is a reset phase. It carried out this reset phase and validates the flag memory. If not, the local server program 109 knows that it is not a reset phase.

In the step 202, the microprocessor is also controlled by the instruction codes of the zone 109b. In the step 202, the microprocessor 107 constitutes a resetting message which comprises the request 101. This resetting message is then sent to the network controller server 122. In the step 202, the term "sending" means that the resetting message is broadcast radioelectrically by RF means of the telephone 101.

In the step 202 the operation passes firstly to a step 203 of response to the first request and, secondly, also to a step 204 for parametrizing the network controller server 122.

The step 203 is carried out by the local server program 109. In the step 203, the microprocessor 107 therefore prepares a response to the request sent in the step 201 by the application 108. This is a standard response defined by the protocol used, whether it is POP or IMAP and indicating, for example, that it is not possible to link up with the service server 115 or that it is busy. This response may also indicate that there is no new message. This response is aimed at being a decoy for the application 108. Indeed, the application 108 must think that it has set up communication with the service server 115. Once prepared, the response to the request 1 is sent in the same sense as "sending" is referred to in the step 201. This is to say that this response will never actually leave the telephone 101. From the step 203, the operation passes to a step 205 for the reception of a response to the first request. In the step 205, the application 208 receives a response formatted according to the protocol that it had used to send the request in the step 201. This response then conforms to what was expected from the application 108. The application 108 therefore processes this response as if it had been sent by the server 115.

In the step 204, the network controller server 122 receives a resetting message. This resetting message enables the microprocessor 125 to update the configuration memory 127. In the step 204, the microprocessor 125 is controlled by the instruction codes of the zones 126b and 126c. In the step 204 the microprocessor 125 uses the information contained in the resetting message to update the memory 127. This updating consists of the creation of a new column and the filling in of information in the row-fields of this new column.

The information on interrogation frequency is either obtained by means of the time intervals between the first two requests sent by the application 108, or directly read in the memory 114 by the local server program 109. This interrogation frequency is inserted into the resetting message of the step 202.

The fields filled in are those already described here above for the steps 201, 202 and in the description of the means implemented by the method according to the invention.

The steps 201 to 205 constitute a reset phase of the method according to the invention. During this phase, the local server program 109 works in reset mode.

From the step 205, the application 108 goes to a step 206 for sending a second request for the interrogation of the service server 115. This second request is identical to the request that had been sent in the step 201. This request is therefore sent in the same way as in the case of the step 201. From the viewpoint of the application 108, the step 206 is identical to the step 201. The operation then goes to a step 207 implemented by the local server program 109.

In the step 207 the program 109 intercepts the second request in the same way as the step 202. It then sends a response to the second request, thus simulating the fact that the server 115 is busy or cannot be hooked up to or, for example, that there is no new message. The operation then passes to the step 208, implemented by the application 108, for the reception of the response to the second request. The step 208 is identical to the step 205.

In practice, the time interval between the step 201 and the step 206 is governed by the contents of the memory 114 corresponding to the frequency of interrogation, by the application 108, of the service server 115.

The steps 206 to 208 illustrate the working of the local server program 109 in blocking mode. In this blocking mode, the program 109 intercepts all the messages sent by the application 108 and transmits a response to it signifying that there is no change of context in the server 115. In the blocking mode, there is no RF transmission whatsoever resulting from an interrogation of the server 115.

From the step 204, the network controller server 122 passes to a step 209 for the interrogation of the service servers In the step 209, the microprocessor 125, controlled by the instruction codes of the zone 126a, goes through the table 127 in order to determine which service server it must interrogate. This determining is done with respect to an internal clock (not shown) of the server 122, and with reference to the information on interrogation frequency in the row 127e.

When the microprocessor 125 finds an interrogation to be made in the table 127, the microprocessor 125 uses the information of the column in question to send an interrogation request to the service server. To prepare this request, it uses the information included in the column, especially the identifier 127b, the password 127c and the address 127d of the service server. The request for the interrogation of the service server 115 prepared at the step 209 by the network controller 122 is identical to the interrogation request prepared at the steps 201 and 206, except that the response address, for the service server 115, is that of the network controller server 122.

For the interrogation of a message server, the protocol used is preferably the IMAP protocol. This protocol makes it possible indeed to send out requests to obtain information on the number of new messages in an electronic letterbox. This lightens communications between the server 122 and the server 115.

The interrogation request sent by the server 122 travels through the network 104 up to the server 115. The operation goes from a step 209 to the step 210 of response from the service server 115.

In the step 210, the server 115 receives an interrogation request in order to find out the status of an electronic letterbox. This electronic letterbox is identified by a "login" 127b/111 and the password 127c/112. This information enables the microprocessor 118 to determine a row in the table 121, and therefore a messaging account. This address enables the microprocessor 118 to find the corresponding messages in the storage memory 120. Then the server 115 prepares a response to the interrogation request sent at the step 209, and this response is sent to the address of the server that has sent the request, namely to the address of the server 122. From the step 210, the operation passes to a step 211 in which the server 122 analyzes the response from the server 115.

In the step 211, the microprocessor 125 determines whether there are new messages in the letterbox that has been interrogated. This determining is done as a function of the contents of the response from the server 115 to the request sent in the step 209. This is a request according to the IMAP protocol seeking to know the number of new messages in an electronic letterbox. The response therefore comprises a number of new messages. If this number is zero, it means that there is no new message. If there is no new message, the operation goes back to the step 209 and the interrogations continue. If there is at least one new message, then the operation goes to a step 212 for opening the proxy.

In the step 212, the microprocessor 125 prepares a message to open the proxy. The addressee of this message is determined by means of the contents of the memory 127. Indeed, from an identifier 127b and a password 127c, the microprocessor 125 can determine an identifier 127a of a telephone 101. This identifier is either an Internet address or, for example, a telephone number enabling a short message to be sent.

The proxy opening message is therefore a simple message addressed to the local server program 109 comprising an instruction code indicating that the mode of operation of the local server program 109 must be changed. The operation then passes to a step 213 for opening the proxy.

In the step 213, the local server program 109 receives the message sent at the step 212. The local server program 109 knows that, in this case, it must no longer block the messages sent by the application 108. The local server program 109 then goes into relay mode.

From the step 208, the application 108 goes to a step 214 for sending the third request. For the purposes of this description, the step 214 is considered to come after the step 213. This is to say that, when the step 214 takes place, the program 109 is in relay mode. The step 214 is identical to the steps 201 and 206. From the step 214, the operation passes to a step 215 for relaying the request. The step 215 is implemented by the local server program 109. In this step, the local server program 109 behaves like the application 108, that is to say that it sends the interrogation request, this time radioelectrically. The operation then goes to a step 216 of response to the service server 115.

When it is in relay mode, the local server program 109 no longer diverts the requests sent by the application 108 to the network controller server 122. It behaves like a simple intermediary in the routing of the messages, without intervening any longer either on their contents or with respect to their addressee. In the step 216, the server 115 receives an interrogation request from a classic electronic letterbox and hence responds to it in a known way. This response is intercepted, in the step 217, by the local server program 109. Once again, the program 109 is in relay mode. It therefore retransmits the response of the server 115 directly to the application 108. This is the step 218 for the processing, by the application 108, of the response of the server 115 to the request sent at the step 214. This is a classic and known step.

From the step 217, the local server program 109 also goes to a step 219 in which it again starts functioning in blocking mode as described for the steps 206 to 208.

Figure 2A:
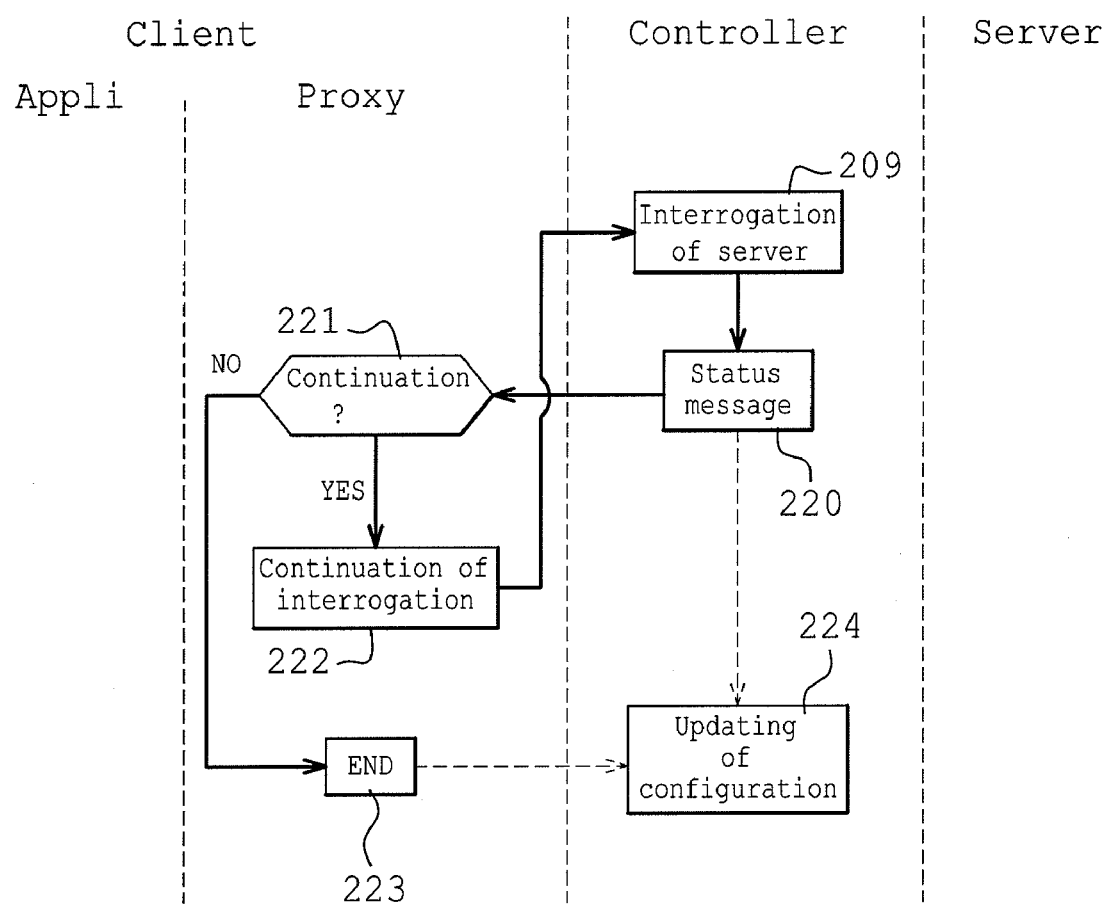
FIG. 2a is an illustration of steps of the method according to the invention.

FIG. 2a shows that the step 209 can also be followed by a step 220 for sending a status message. The step 220 can actually be performed at any time whatsoever by the network controller server 122. It entails the sending of the status message to the local server program 109. Ideally, the step 220 appears at regular intervals. A status message is designed to inform a local server program that the server 122 is continuing to interrogate the server 115. From the step 220, the operation passes to a step 221 for the reception, by the local server application 109, of the status message. In the step 221, the program 109 determines whether or not it is necessary to continue to interrogate the server 115. If the interrogation has to be continued, the operation passes to a step 222 for continuing the interrogation. The step 222 then actually consists of a positive response to the status message. The local server program 109 then sends a "continuation of interrogation" response to the network controller server 122. If no response has to be made, the operation than passes to an end-of-interrogation step 223.

At the step 223, no response is sent to the status message. In this case, the network controller 122 detects the fact that no answer has been received in response in its status message, and it updates its configuration. This is the step 224.

The step 224 actually consists in erasing a column from the memory 127. This column corresponds to the identifier 127a for which no response has been received to a status message. In practice, it may be considered that a message to open proxy is a status message, but it is not the only possible status message.

A status message may also comprise a piece of information according to which no new message has been received since the last status message.

In practice, the change in mode of operation of the local server program 109 may also be prompted by a deadline or time limit. For example, if a certain amount of time has elapsed in which the local server program 109 has not received any status message from the server 122, the local server program 109 can then assume that the network controller server 122 is no longer active. In this case, the local server program 109 itself goes into relay mode. In relay mode, the local server program 109 no longer responds to the status messages from the network controller server 122.

The passage from one mode to the other may also be enforced by the telephone user 101.

With the implementation of the invention, it can be seen that the connections made between the telephones 101 and the service server 115 take place only when they are truly useful, i.e. when there are new messages to be consulted with respect to a messaging server.

The teaching of the invention can easily be extended to all communications with a client mobile having to regularly interrogate a change in context on this server. In this case, the regular interrogations are made by the network controller server 122 and not by the telephone 101. This makes it possible not avoid overloading the radiofrequency part of the network and to avoid unnecessarily wasting the power of the mobile telephone 101.

In one variant of the invention, when the server 122 detects a change in context on the server 115, the server 122 repatriates this new context, for example the new messages, on the server 122. The messages to the telephone 101 are then repatriated, not between the telephone 101 and the server 115, but between the telephone 101 and the server 122.

It is quite possible to envisage different communications protocols between, firstly, the application 108 and the server 115 and, secondly, the local server program 109 and the network controller server 122. Indeed, the network controller server 122 is led to send messages to the telephone 101 which are not permanently connected to the Internet, above all in the IPv4 standard. This means that the telephone 101 does not permanently have a valid Internet address. In this case, it is possible to use the short messages protocol, for example, to set up communication between the telephone 101 and the server 122. Since the other communications of the telephone 101 are all outgoing communications, they can be done following a connection to the Internet of the telephone 101, initiated by this telephone 101.

What is claimed is:

1. A system for the optimization of network traffic comprising a mobile client and a service server, wherein the system comprises:

a client application, executed by the mobile client, that sends a first request intended for the service server, and a local server program, executed by the mobile client, that intercepts the first request intended for the service server, wherein the local server program is driven by a network controller server and produces an initialization message from the contents of the first request, the initialization message comprising information, enabling a controller server to assume the role of the client application, the initialization message also comprising information on a service server to be interrogated, this information being preferably the service server address on a network and the service server type, the local server program sends the initialization message to the controller server, the controller server receives the initialization message and gets parameterized as a function of the contents of the initialization message to send requests addressed to the service server, the controller server receives a response from the service server and sends an opening message to the local server program, the local server program receives the opening message and gets parameterized accordingly, the client application sends a subsequent request to the service server, and wherein the local server program intercepts the subsequent request and relays it directly to the service server.

2. The system according to claim 1, wherein the subsequent request is a third request and the client application sends a second request to the service server, the local program server intercepts the second request and interrupts its routing, the local server program produces and sends a response to the client application, the client application receives the response from the local server program.

3. The system according to claim 2, wherein the controller server sends the second request to the service server in assuming the role of the client application and the service server receives the second request from the controller server and responds to it, and the service server receives and processes the subsequent request.

4. The system according to claim 1, wherein the local program server blocks the requests of the client application until the local server program receives an opening message from the controller server.

5. The system according to claim 1, wherein the local server program blocks the requests of the client application until the expiry of a predefined duration.

6. The system according to claim 1, wherein the controller server sends a status message to the local server program, and the controller server interrupts the sending of a request to the service server if the controller server receives no response, corresponding to the status message, from the local server program.

7. The system according to claim 1, wherein the client application is an electronic messaging client application and the service server is a messaging server.

8. The system according to claim 1, further comprising a client devicethat comprises a program memory comprising instruction codes corresponding to the client application sending requests to the service server, the program memory also comprising instruction codes corresponding to the local server program to intercept and process messages sent by the client application and to receive and process messages sent by the controller server.

9. The system according to claim 1, wherein the controller server comprises a configuration memory to record information pertaining to the initialization message, the controller server also comprising a program memory comprising instruction codes to send requests to the service server as a function of the contents of the configuration memory, the program memory also comprising instruction codes to send an opening message and a status message to the local server program, as a function of a response to a request.

10. A method for the optimization of network traffic, the network including a mobile client and a service server, wherein the method comprises the following steps:

sending a first request through the execution of a client application by the mobile client, the first request being intended for the service server, intercepting the first request through the execution a local server program by the mobile client, producing an initialization message from the contents of the first request through the execution of the local service program, the initialization message comprising information enabling a controller server to assume the role of the client application, the initialization message also comprising information on a service server to be interrogated, sending the initialization message from the local server program to the controller server, receiving the initialization message at the controller server and parameterizing the controller server as a function of the contents of the initialization message, receiving a response at the controller server and sending an opening message to the local server program, receiving the opening message at the local server program and parameterizing the opening message accordingly, sending a subsequent request through the execution of the client application by the mobile client, the subsequent request being intended for the service server, and intercepting the subsequent request through the execution of the local server program by the mobile client and relaying the subsequent request directly to the service server.

11. A method according to claim 10, wherein the subsequent request is a third request and the method further comprising the following steps:

sending a second request through the execution of the client application by the mobile client, the second request being intended for the service server, intercepting the second request and interrupting the routing of the second request through the execution of the local server program by the mobile client, producing and sending a response to the client application through the execution of the local server program by the mobile client, receiving the response at the client application.

12. A method according to claim 11 further comprising the following steps:

sending the second request from the controller server to the service server, the service server assuming the role of the client application, receiving the second request from the controller server at the service server and responding to the second request, receiving and processing the third request at the service server.

13. A method according to claim 10, further comprising blocking requests of the client application until the local server program receives an opening message from the controller server.

14. A method according to claim 10, further comprising blocking requests of the client application, through the execution of the local server program by the mobile client, until the expiry of a predefined duration.

15. A method according to claim 10, further comprising the following steps:

sending a status message from the controller server to the local server program, interrupting the sending of a request to the service server from the controller server if the controller server receives no response corresponding to the status message from the local server program.

16. A method according to claim 10, wherein the client application is an electronic messaging client application and the service server is a messaging server.

* * * * *